(12) United States Patent
Sawabe et al.

(10) Patent No.: US 6,386,954 B2
(45) Date of Patent: May 14, 2002

(54) THREAD FORMING TAP AND THREADING METHOD

(75) Inventors: Teruo Sawabe, Miyagi; Isao Yokoyama, Saitama; Kazutoshi Sato, Miyagi, all of (JP)

(73) Assignee: Tanoi Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/801,859

(22) Filed: Mar. 9, 2001

(30) Foreign Application Priority Data

Mar. 9, 2000 (JP) .......................... 2000-064427

(51) Int. Cl.[7] ............ B24B 1/00; B23B 51/00; B21J 13/02
(52) U.S. Cl. .......... 451/48; 408/219; 408/222; 451/57; 470/198
(58) Field of Search ................ 408/222, 215, 408/219, 216; 470/198; 451/48, 49, 57

(56) References Cited

U.S. PATENT DOCUMENTS

| 1,542,893 A | | 6/1925 | Kreutzberger |
| 3,775,792 A | * | 12/1973 | Leonard .................. 10/152 T |
| 5,797,710 A | * | 8/1998 | Sawabe et al. ............. 408/222 |
| 5,928,084 A | | 7/1999 | Green ........................ 470/198 |

FOREIGN PATENT DOCUMENTS

| BE | 396 577 | 5/1933 |
| FR | 601 122 A | 1/1926 |

* cited by examiner

*Primary Examiner*—Timothy V. Eley
(74) *Attorney, Agent, or Firm*—Sughrue Mion, PLLC

(57) ABSTRACT

It is an object of the invention to provide a thread-forming tap to which a chamfer can easily be mounted, and a general threading method. The thread forming tap of the invention has a threaded portion comprising a tapered chamfer and a parallel threaded portion which is formed continuously with the chamfer. A depth of root of the chamfer is set equal to that of a root of the parallel threaded portion constantly.

3 Claims, 7 Drawing Sheets

GRIND PARALLEL PORTION

GRIND FRONT FLANK

GRIND REAR FLANK

GRIND OUTER DIAMETER PORTION OF CHAMFER

GRIND REAR FLANK

GRIND FRONT FLANK

GRIND PARALLEL PORTION

GRIND OUTER DIAMETER PORTION OF CHAMFER

THREAD FORMING TAP AND THREADING METHOD

The entire disclosure of Japanese Patent Application No. 2000-064427 filed on Mar. 9, 2000 including specification, claims, drawings and summary is incorporated herein by reference in its entirety.

BACKGROUND OF THE INVENTION

1. Field of the Invention

The present invention relates to a thread forming tap and a threading method.

2. Description of the Related Art

As shown in FIG. 6, a conventional thread forming tap has a threaded portion 100 comprising a chamfer 101 which is tapered to form a complete mountain-like (angle) shape (see inclination angle in FIG. 6), and a parallel thread 102 which is formed continuously with the chamfer 101. The thread forming tap also comprises a plurality of oil grooves disposed in a circumferential direction of the thread forming tap.

When the thread forming tap is ground, as shown in FIG. 7, an end of the thread forming tap (raw material) W on the side of the threaded portion 100 and an end of the thread forming tap on the side of a shank 103 are supported by center portions 104a and 104b of a thread grinder, the thread forming tap W is rotated and in this state, the thread forming tap W is constantly fed to a rotating grinding stone 105 to carry out a traverse grinding.

In the conventional thread forming tap, since the chamfer 101 is tapered to form the complete mountain-like shape, the grinding stone 105 goes in and out from the chamfer 101 deeply (as compared with the parallel thread 102) correspondingly at the time of grinding.

Therefore, if the thread forming tap has a small diameter (like a miniature thread such as a hard disk), there is a problem that a tip end of the grinding stone 105 abuts against the threaded portion-side center portion 104a to damage the latter, and the chamfer 101 can not be formed.

Further, according to the conventional grinding method, since the thread forming tap is fed constantly, in the chamfer 101 immediately before it is fed to the parallel thread 102, a pitch of any of a crest and a root of the thread is formed differently.

Thus, at the time of tapping, in the chamfer 101 immediately before it is fed to the parallel thread 102, an excessive force is applied to a front or rear flank of the thread, there is a problem that an amount of heat is increased, and this shortens the life of the tap.

SUMMARY OF THE INVENTION

The present invention has been accomplished in view of the above circumstances, and it is an object of the invention to provide a thread forming tap to which a chamfer can easily be mounted, and a general threading method.

To achieve the above object, according to the present invention, there is provided a thread forming tap having a threaded portion comprising a tapered chamfer and a parallel threaded portion which is formed continuously with the chamfer, wherein a depth of root of the chamfer is set equal to that of a root of the parallel threaded portion constantly.

The invention also provides a threading method for a thread forming tap having a threaded portion comprising a tapered chamfer and a parallel threaded portion which is formed continuously with the chamfer, wherein after a parallel portion from the chamfer to the parallel threaded portion is continuously ground, a front flank to a rear flank of the chamfer are ground while alternately and gradually changing a feeding ratio between a tip end and a rear end of the chamfer and then, an outer diameter portion of the chamfer is ground.

The invention also provides a threading method wherein a front flank and a rear flank of a thread are formed while alternately and gradually changing a feeding ratio between a tip end and a rear end of threaded portion and then, a parallel threaded portion is formed and thereafter, an outer diameter portion of the thread is ground.

DESCRIPTION OF THE PREFERRED EMBODIMENTS

A thread forming tap and a threading method of the present invention will be explained in detail based on the following embodiments.

[First Embodiment]

Figure 1:
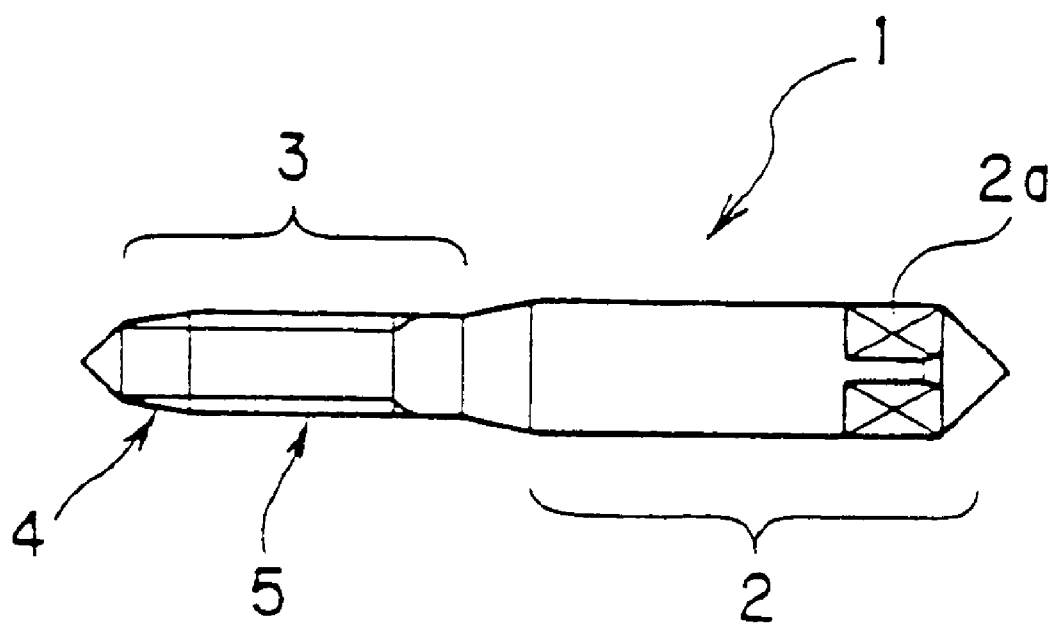
FIG. 1 is a side view of a thread forming tap according to a first embodiment of the present invention.
Figure 2:
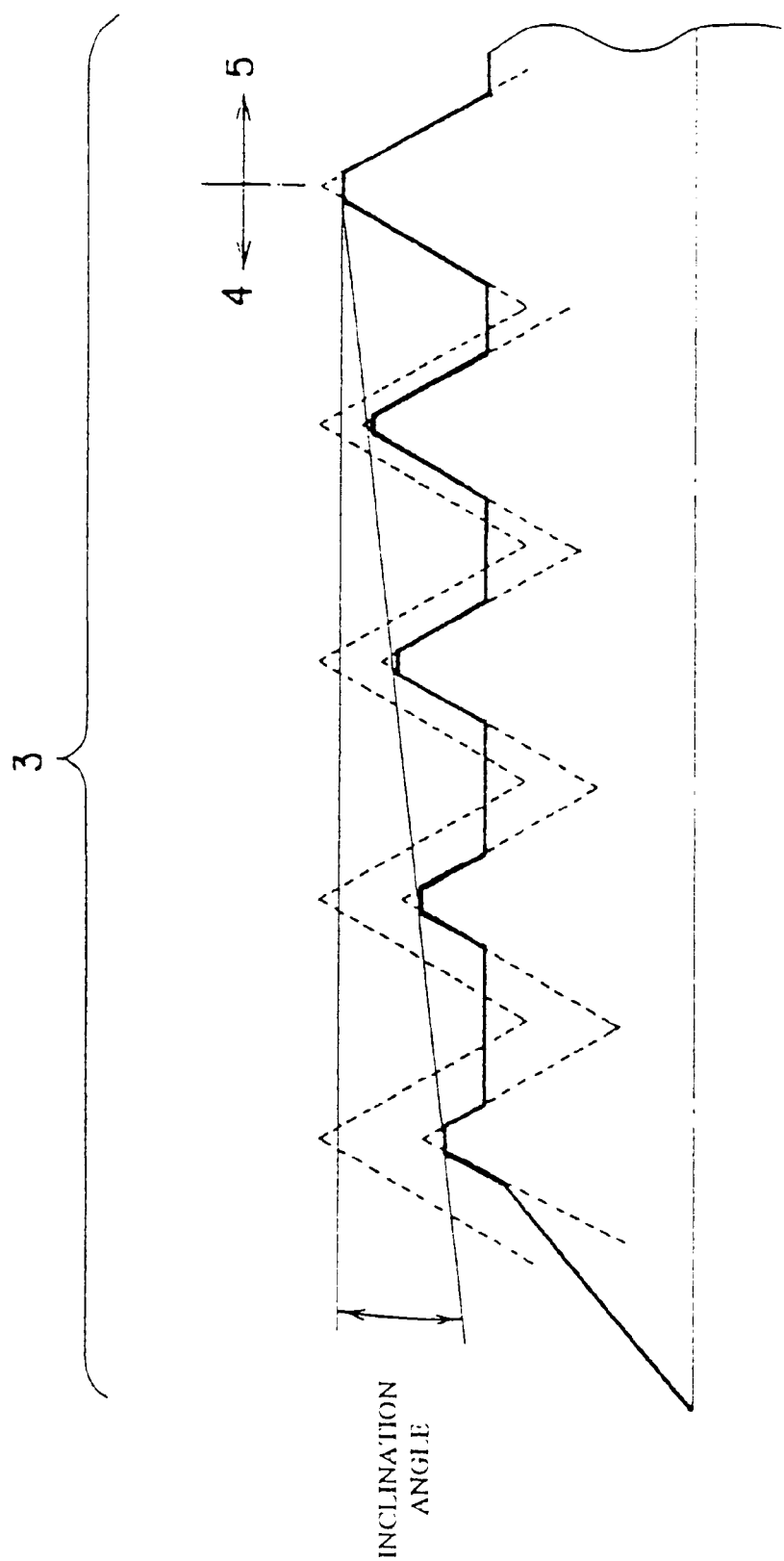
FIG. 2 is an enlarged view of a threaded portion of the thread forming tap.
Figure 3:
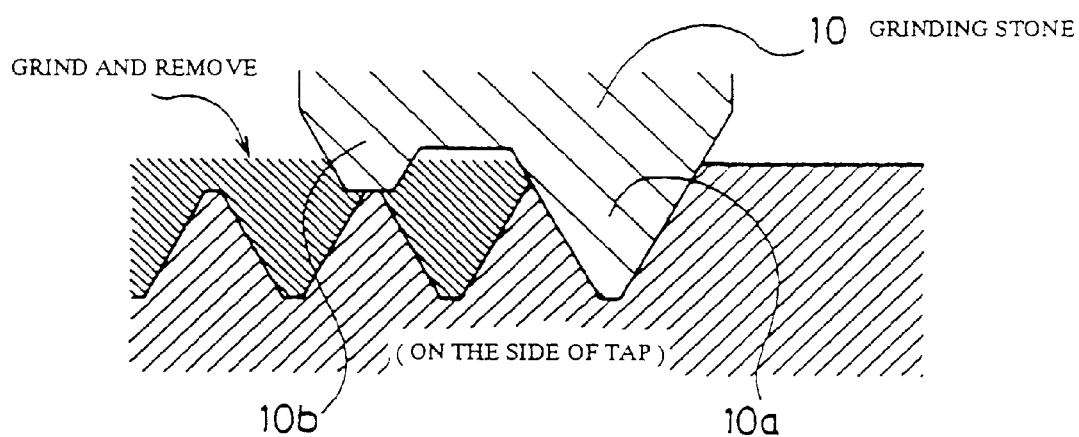
FIG. 3 is a view showing a conception of a threading method of the invention.
Figure 4:
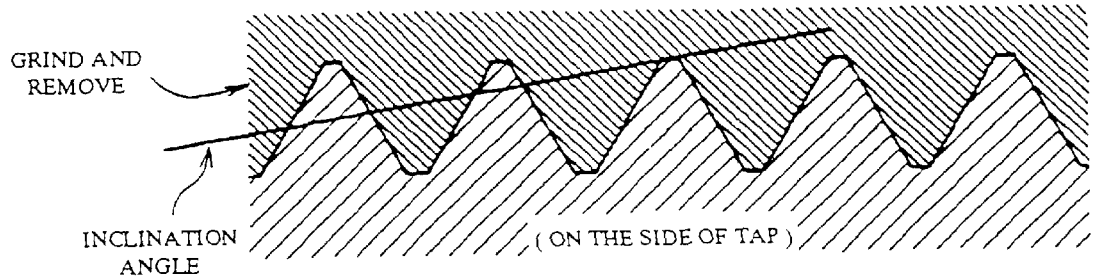
FIGS. 4(a) to 4(d) are views showing steps of the threading method.
Figure 4:
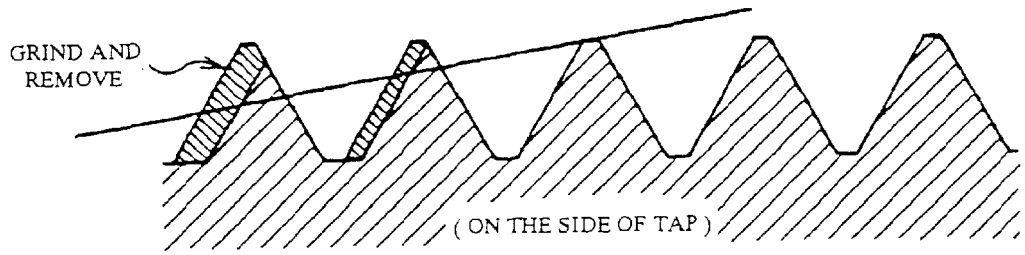
Figure 4:
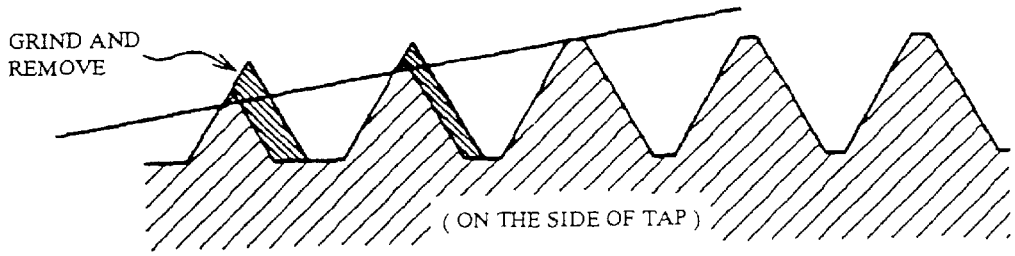
Figure 4:
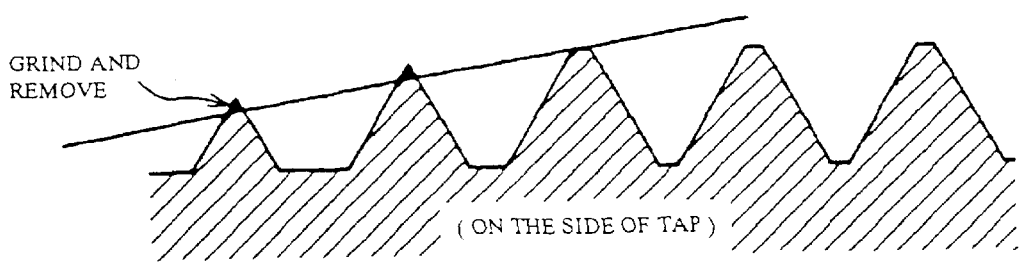
Figure 5:
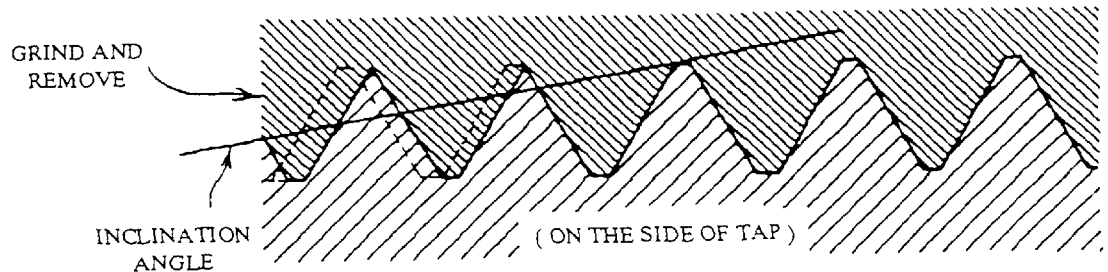
FIGS. 5(a) to 5(d) are views showing steps of a forming method of a thread forming tap according to a second embodiment of the invention.
Figure 5:
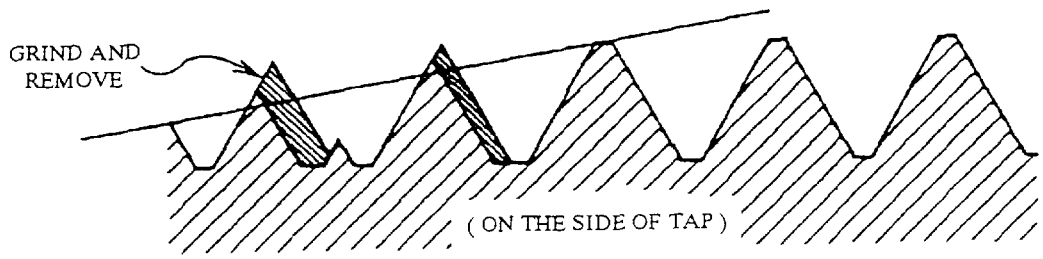
Figure 5:
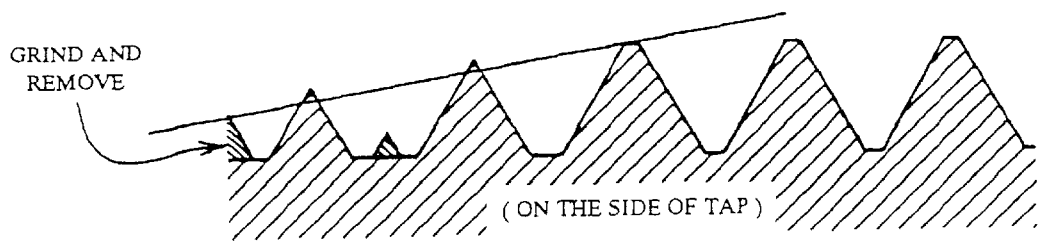
Figure 5:
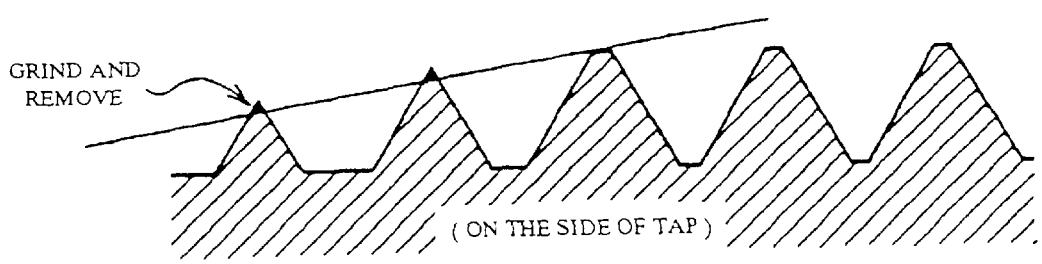
Figure 6:
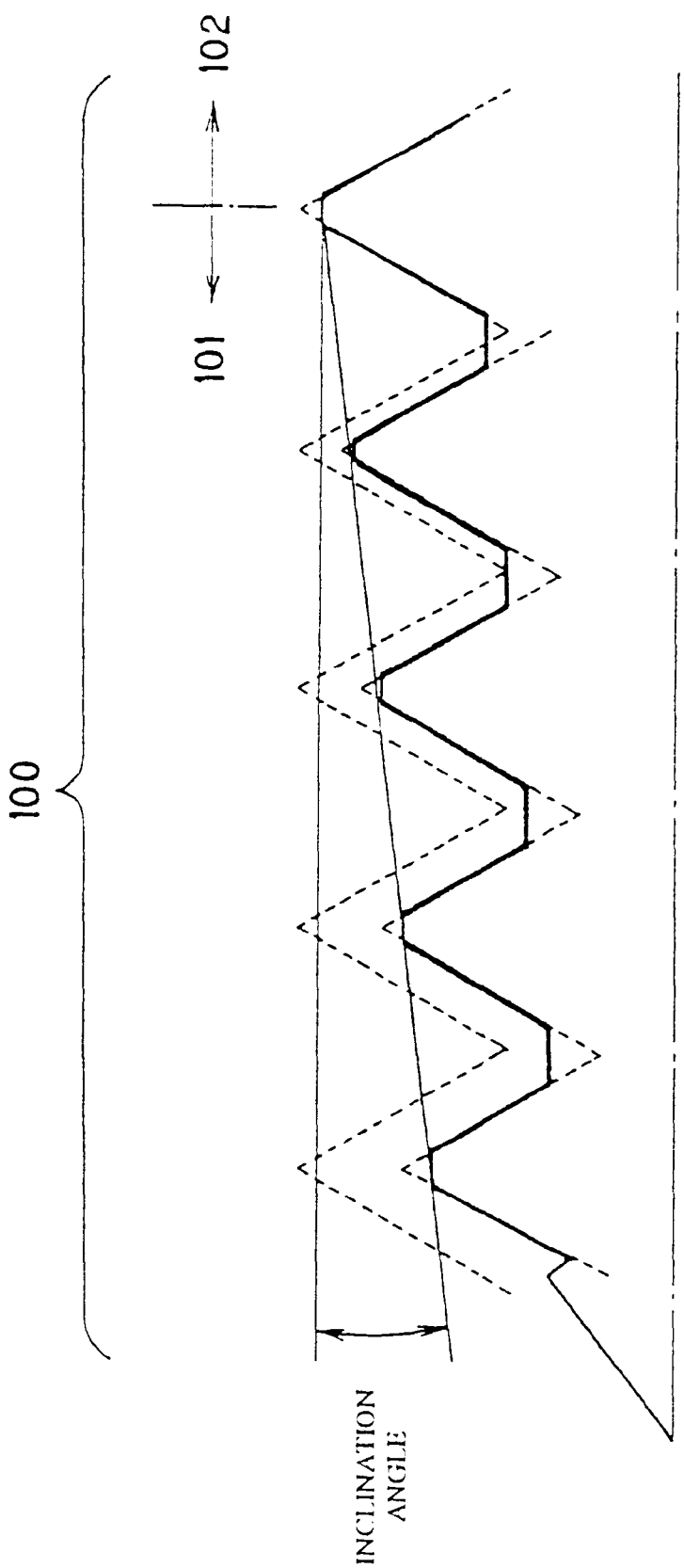
FIG. 6 is an enlarged view of a threaded portion of a conventional thread forming tap.

FIG. 1 is a side view of a thread forming tap according to a first embodiment of the present invention, FIG. 2 is an enlarged view of a threaded portion of the thread forming tap, FIG. 3 is a view showing a conception of a threading method of the invention and FIGS. 4 are views showing steps of the threading method.

As shown in FIG. 1, a thread forming tap 1 comprises a shank 2 having a rear end 2a to be chucked by a taping machine. The rear end 2a has a substantially rectangular cross section. The thread forming tap 1 also comprises a threaded portion 3 for threading a prepared hole formed in a member to be ground (not shown).

As shown in FIG. 2, the threaded portion 3 includes a tapered chamfer 4 (see inclination angle in FIG. 2) and a parallel threaded portion 5 which is formed continuously with the chamfer 4, and a plurality of oil grooves (not shown) disposed in the circumferential direction.

In this embodiment, a depth of root of the chamfer 4 is set equal to that of the root of the parallel threaded portion 5 constantly (about root truncation H/4) and the crest is inclined with the same pitch.

The thread forming tap 1 is produced by a forming method (threading grinding method) shown in FIGS. 3 and 4.

Figure 7:
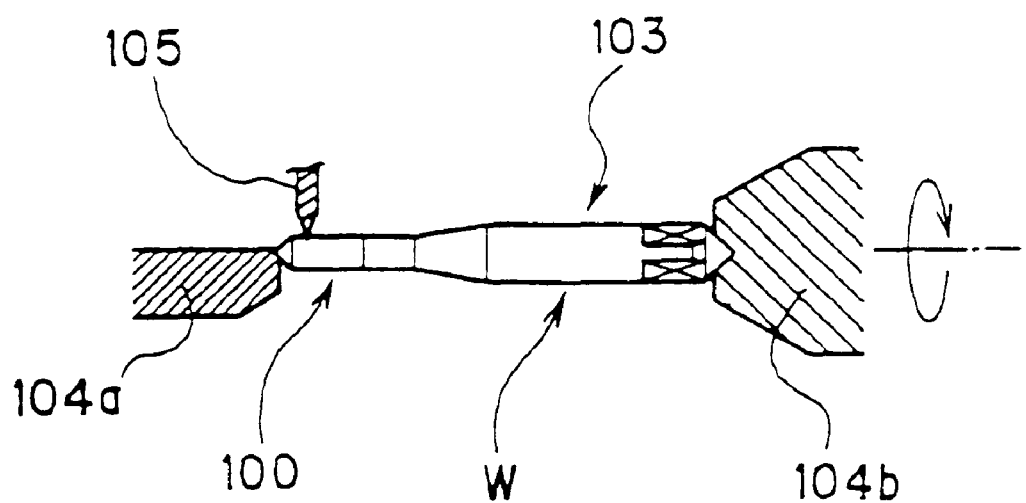
FIG. 7 is a view showing a conception of a forming method of the conventional thread forming tap.

First, as shown in FIG. 3, a grinding stone 10 having a thread grinding portion 10a corresponding to a shape of thread of the thread forming tap 1 to be formed, and an outer diameter grinding portion 10b for equally forming the outer diameter of the parallel threaded portion 5 is formed by a diamond rotary dresser or the like, and is set on a thread grinder shown in FIG. 7.

At the time of thread grinding, as shown in FIG. 4(a), a parallel portion from the chamfer 4 to the parallel threaded portion 5 is continuously ground to form the thread of the parallel threaded portion 5.

Then, as shown in FIG. 4(b), a front flank portion of the chamfer 4 is ground one or more times. At that time, a feeding ratio (per one revolution at constant speed) of the thread forming tap (raw material) 1 or the grinding stone 10 from a tip end to the rear end of the chamfer 4 is gradually reduced.

Next, as shown in FIG. 4(c), a rear flank portion of the chamfer 4 is ground one or more times. At that time, reversely, the feeding ratio (per one revolution at constant speed) of the thread forming tap (raw material) 1 or the grinding stone 10 from the tip end to the rear end of the chamfer 4 is gradually reduced.

Lastly, as shown in FIG. 4(d), the outer diameter portion of the chamfer is ground using the thread grinding portion 10a of the grinding stone 10 or another grinding stone.

In this manner, the depth of root of the chamfer 4 is set equal to that of the root of the parallel threaded portion 5 constantly and the crest is inclined with the same pitch, and the thread forming tap 1 is produced. In the above steps, the grinding step of the front flank and the grinding step of the rear flank may be exchanged.

By producing the thread forming tap 1 in this manner, an amount of going in and out of the grinding stone 10 at the time of the thread grinding is reduced (to the depth of the root of the parallel threaded portion 5 at the maximum), even if the diameter of the thread forming tap is small, the tip end of the grinding stone 10 does not abut against the center portion on the side of the threaded portion, the center portion is not damaged and thus, the chamfer can be formed easily and reliably.

In the above producing steps, since the front flank and the rear flank of the chamfer 4 are ground while changing the feeding ratio. Therefore, even in the chamfer 4 immediately before it moves to the parallel threaded portion 5, the crest and the root can be ground with the same pitch. Thus, at the time of tapping, an excessive force is not applied to the front or rear flank of the thread due to uneven pitches like the conventional example, the amount of heat is not increased, and the life of the tap is not shortened. [Second Embodiment]

FIGS. 5(a)–5(d) are views showing steps of the forming methods of a thread forming tap according to the second embodiment of the invention.

The grinding operation of the front flank and the rear flank in the forming method of the first embodiment is carried out before the parallel portion is ground. The working effect is the same as that of the first embodiment. In this embodiment also, the grinding step of the front flank and the grinding step of the rear flank may be exchanged.

In this forming method of this embodiment, since the front and rear flanks are ground while changing the feeding ratio before the parallel portion is ground, thread having discontinuous pitch can be formed, and threaded portion of various reed can be formed with one tool.

Therefore, the forming method of this embodiment is not limited to the thread grinding of the thread forming tap, and can be applied to grinding or cutting operations of other thread (spindles, lead screws, nuts, chamfers of roll threading dies).

The present invention is not limited to the above embodiments, and various modifications can be made without departing from the subject matter of the invention of course.

The thread forming tap of the invention has a threaded portion comprising a tapered chamfer and a parallel threaded portion which is formed continuously with the chamfer, and a depth of root of the chamfer is set equal to that of a root of the parallel threaded portion constantly. Therefore, an amount of going in and out of the grinding stone at the time of the thread grinding is reduced, even if the diameter of the thread forming tap is small, the tip end of the grinding stone does not abut against the center portion on the side of the threaded portion, the center portion is not damaged and thus, the chamfer can be formed easily and reliably.

In the threading method of the invention for a thread forming tap having a threaded portion comprising a tapered chamfer and a parallel threaded portion which is formed continuously with the chamfer, after a parallel portion from the chamfer to the parallel threaded portion is continuously ground, a front flank to a rear flank of the chamfer are ground while alternately and gradually changing a feeding ratio between a tip end and a rear end of the chamfer and then, an outer diameter portion of the chamfer is ground. Therefore, even in the chamfer immediately before it moves to the parallel threaded portion, the crest and the root can be ground with the same pitch. Thus, at the time of tapping, an excessive force is not applied to the front or rear flank of the thread due to uneven pitches like the conventional example, the amount of heat is not increased, and the life of the tap is not shortened.

In the threading method of the invention, a front flank and a rear flank of a thread are formed while alternately and gradually changing a feeding ratio between a tip end and a rear end of threaded portion and then, a parallel threaded portion is formed and thereafter, an outer diameter portion of the thread is ground. Therefore, thread having discontinuous pitch can be formed, and threaded portions of various reed can be formed with one tool.

What is claimed is:

1. A threading method wherein a front flank and a rear flank of a thread are formed while alternately and gradually changing a feeding ratio between a tip end and a rear end of threaded portion and then, a parallel threaded portion is formed and thereafter, an outer diameter portion of the thread is ground.

2. A threading method of a thread forming tap having a threaded portion comprising a tapered chamfer and a parallel threaded portion which is formed continuously with the chamfer, wherein after a parallel portion from the chamfer to the parallel threaded portion is continuously ground, a front flank to a rear flank of the chamfer are ground while alternately and gradually changing a feeding ratio between a tip end and a rear end of the chamfer and then, an outer diameter portion of the chamfer is ground.

3. A thread forming tap having a threaded portion comprising a tapered chamfer and a parallel threaded portion which is formed continuously with the chamfer, wherein a depth of a root of the chamfer is set equal to that of a root of the parallel threaded portion constantly.

* * * * *